United States Patent
Stoia et al.

(10) Patent No.: US 9,267,436 B2
(45) Date of Patent: Feb. 23, 2016

(54) FUEL DISTRIBUTION MANIFOLD FOR A COMBUSTOR OF A GAS TURBINE

(71) Applicant: General Electric Company, Schenectady, NY (US)

(72) Inventors: Lucas John Stoia, Taylors, SC (US); Patrick Benedict Melton, Horse Shoe, NC (US); Stanley Kevin Widener, Greenville, SC (US); William Michael Poschel, Greenville, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 589 days.

(21) Appl. No.: 13/845,422

(22) Filed: Mar. 18, 2013

(65) Prior Publication Data

US 2014/0260274 A1 Sep. 18, 2014

(51) Int. Cl.
*F02C 1/00* (2006.01)
*F02C 7/22* (2006.01)
*F23R 3/28* (2006.01)

(52) U.S. Cl.
CPC . *F02C 7/222* (2013.01); *F02C 7/22* (2013.01); *F23R 3/28* (2013.01)

(58) Field of Classification Search
CPC ............ F02C 7/22; F02C 7/222; F02C 7/228; F23R 3/28; F23R 3/34; F23R 3/346
See application file for complete search history.

(56) References Cited

U.S. PATENT DOCUMENTS

| | | | | |
|---|---|---|---|---|
| 3,768,251 | A * | 10/1973 | Camboulives et al. | 60/796 |
| 4,966,001 | A * | 10/1990 | Beebe | 60/737 |
| 5,417,069 | A * | 5/1995 | Alary et al. | 60/747 |
| 6,883,329 | B1 * | 4/2005 | Martling | 60/746 |
| 7,137,256 | B1 * | 11/2006 | Stuttaford et al. | 60/773 |
| 7,743,612 | B2 | 6/2010 | Morenko | |
| 8,096,131 | B2 | 1/2012 | Ziaei et al. | |
| 8,171,738 | B2 | 5/2012 | Fish et al. | |
| 2010/0192581 | A1 * | 8/2010 | Ziminsky et al. | 60/737 |
| 2011/0239652 | A1 * | 10/2011 | McMahan et al. | 60/737 |
| 2011/0239653 | A1 * | 10/2011 | Valeev et al. | 60/740 |

* cited by examiner

*Primary Examiner* — Gerald L Sung
(74) *Attorney, Agent, or Firm* — Dority & Manning, PA (57) ABSTRACT

A fuel distribution manifold for a combustor of a gas turbine includes an annular flange having an outer surface that extends circumferentially around the flange. A primary fuel plenum extends circumferentially within the flange. A first orifice and a second orifice extend radially through the outer surface of the flange to provide for fluid communication into the primary fuel plenum. The first orifice includes an inlet that is adjacent to the outer surface. The second orifice includes an inlet that is adjacent to the outer surface. A fuel distribution cap extends partially across the outer surface of the flange. The fuel distribution cap includes an inlet port. A fuel distribution plenum is at least partially defined within the fuel distribution cap. The fuel distribution plenum is in fluid communication with the inlet port and with the first orifice inlet and the second orifice inlet.

20 Claims, 10 Drawing Sheets

FUEL DISTRIBUTION MANIFOLD FOR A COMBUSTOR OF A GAS TURBINE

FIELD OF THE INVENTION

The present invention generally involves a combustor for a gas turbine. More specifically, the invention relates to a fuel distribution manifold of the combustor.

BACKGROUND OF THE INVENTION

A combustion section of a gas turbine generally includes a plurality of combustors that are arranged in an annular array around an outer casing such as a compressor discharge casing. Pressurized air flows from a compressor to the compressor discharge casing and is routed to each combustor. Fuel from a fuel nozzle is mixed with the pressurized air in each combustor to form a combustible mixture within a primary combustion zone of the combustor. The combustible mixture is burned to produce hot combustion gases having a high pressure and high velocity. The combustion gases are routed towards an inlet of a turbine of the gas turbine through a hot gas path that is at least partially defined by an annular combustion liner and an annular transition duct that extends downstream from the combustion liner and terminates at the inlet to the turbine. Thermal and kinetic energy are transferred from the combustion gases to the turbine to cause the turbine to rotate, thereby producing mechanical work. For example, the turbine may be coupled to a shaft that drives a generator to produce electricity.

In particular combustors, a combustion module is utilized to inject a generally lean fuel-air mixture into the hot gas path downstream from the primary combustion zone. The combustion module generally includes an annular fuel distribution manifold and a fuel injection assembly that extends between the fuel distribution manifold and the inlet to the turbine. The fuel injection assembly generally includes an annular combustion liner that defines the hot gas path within the combustor. The fuel injection assembly further includes a plurality of radially extending fuel injectors, also known as late lean fuel injectors that are fluidly coupled to the fuel distribution manifold. The fuel injectors inject the lean fuel-air mixture into the hot gas path downstream from the primary combustion zone. As a result, the combustion gas temperature is increased and the thermodynamic efficiency of the combustor is improved without producing a corresponding increase in the production of undesirable emissions such as oxides of nitrogen ($NO_x$).

The fuel distribution manifold includes an annular flange that extends radially outward and circumferentially around the fuel distribution manifold. The flange includes a plurality of axially extending bolt holes arranged circumferentially around the flange and a fuel plenum that is defined within the flange. The flange is bolted to an outer casing that surrounds the combustor to form a seal therebetween. Fuel is delivered to the fuel plenum through an inlet port that extends outward from the flange.

Current fuel distribution manifold designs use a singular inlet orifice that provides for fluid communication between the inlet port and the fuel plenum. At least one of the bolt holes is skipped in order to provide a sufficient inlet area of the inlet orifice to meet the required fuel flow rate to the fuel plenum during late lean fuel injection operation of the combustor. By skipping the one or more bolt hole(s) an uneven preload between the outer casing and the flange results, thereby potentially resulting in leakage of the compressed working fluid around the flange.

A second issue with having a single inlet orifice is that the flow velocity of the fuel through the inlet orifice is undesirably high. In addition, when cold fuel flows into the inlet port and through the inlet orifice, various thermal issues result at an intersection joint formed between the inlet port and the inlet orifice which may impact the overall durability of the fuel distribution manifold. Therefore, an improved fuel distribution manifold, in particular an improved inlet configuration for routing the fuel into the fuel plenum of the fuel distribution manifold would be useful.

BRIEF DESCRIPTION OF THE INVENTION

Aspects and advantages of the invention are set forth below in the following description, or may be obvious from the description, or may be learned through practice of the invention.

One embodiment of the present invention is a fuel distribution manifold for delivering fuel to a combustor of a gas turbine. The fuel distribution manifold includes an annular flange having an outer surface that extends circumferentially around the flange. A primary fuel plenum extends circumferentially within the flange. A first orifice and a second orifice extend radially through the outer surface of the flange to provide for fluid communication into the primary fuel plenum. The first orifice includes an inlet that is adjacent to the outer surface. The second orifice includes an inlet that is adjacent to the outer surface. A fuel distribution cap extends partially across the outer surface of the flange. The fuel distribution cap includes an inlet port. A fuel distribution plenum is at least partially defined within the fuel distribution cap. The fuel distribution plenum is in fluid communication with the inlet port and with the first orifice inlet and the second orifice inlet.

Another embodiment of the present invention is a combustion module for a combustor of a gas turbine. The combustion module includes a fuel injection assembly that terminates at an aft end of the combustion module. The fuel injection assembly includes an annular combustion liner that defines a combustion chamber within the combustion module and a fuel injector that provides for fluid communication through the combustion liner and into the combustion chamber. The combustion module further includes a fuel distribution manifold for delivering fuel to the fuel injection assembly. The fuel distribution manifold includes an annular flange having an outer surface that extends circumferentially around the flange. The flange at least partially defines a primary fuel plenum that extends circumferentially within the flange. A first orifice and a second orifice extend radially through the outer surface of the flange to provide for fluid communication into the primary fuel plenum. The first orifice includes an inlet that is adjacent to the outer surface of the flange, and the second orifice includes an inlet adjacent that is adjacent to the outer surface of the flange. The fuel distribution manifold further includes a fuel distribution cap that extends partially across the outer surface of the flange and that has an inlet port. A fuel distribution plenum is at least partially defined within the fuel distribution cap and is in fluid communication with the inlet port. The fuel distribution plenum is in fluid communication with the first orifice inlet and the second orifice inlet.

The present invention may also include a gas turbine. The gas turbine generally includes a compressor, a combustor disposed downstream from the compressor and a turbine disposed downstream from the combustor. The combustor is at least partially surrounded by an outer casing and includes a fuel distribution manifold for delivering fuel to the combustor. The fuel distribution manifold includes an annular flange having an outer surface that extends circumferentially around the flange. The flange is connected to the outer casing. A primary fuel plenum extends circumferentially within the flange. A first orifice and a second orifice extend radially through the outer surface of the flange to provide for fluid communication into the primary fuel plenum. The first orifice has an inlet that is adjacent to the outer surface of the flange, and the second orifice has an inlet that is adjacent to the outer surface of the flange. A fuel distribution cap extends partially across the outer surface of the flange. The fuel distribution cap includes an inlet port. A fuel distribution plenum is at least partially defined within the fuel distribution cap and is in fluid communication with the inlet port. The fuel distribution plenum is in fluid communication with the first orifice inlet and the second orifice inlet.

Those of ordinary skill in the art will better appreciate the features and aspects of such embodiments, and others, upon review of the specification.

BRIEF DESCRIPTION OF THE DRAWINGS

A full and enabling disclosure of the present invention, including the best mode thereof to one skilled in the art, is set forth more particularly in the remainder of the specification, including reference to the accompanying figures, in which.

DETAILED DESCRIPTION OF THE INVENTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components. The terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation of the invention, not limitation of the invention. In fact, it will be apparent to those skilled in the art that modifications and variations can be made in the present invention without departing from the scope or spirit thereof. For instance, features illustrated or described as part of one embodiment may be used on another embodiment to yield a still further embodiment. Thus, it is intended that the present invention covers such modifications and variations as come within the scope of the appended claims and their equivalents. Although exemplary embodiments of the present invention will be described generally in the context of a combustor incorporated into a gas turbine for purposes of illustration, one of ordinary skill in the art will readily appreciate that embodiments of the present invention may be applied to any combustor incorporated into any turbomachine and is not limited to a gas turbine combustor unless specifically recited in the claims.

Figure 1:
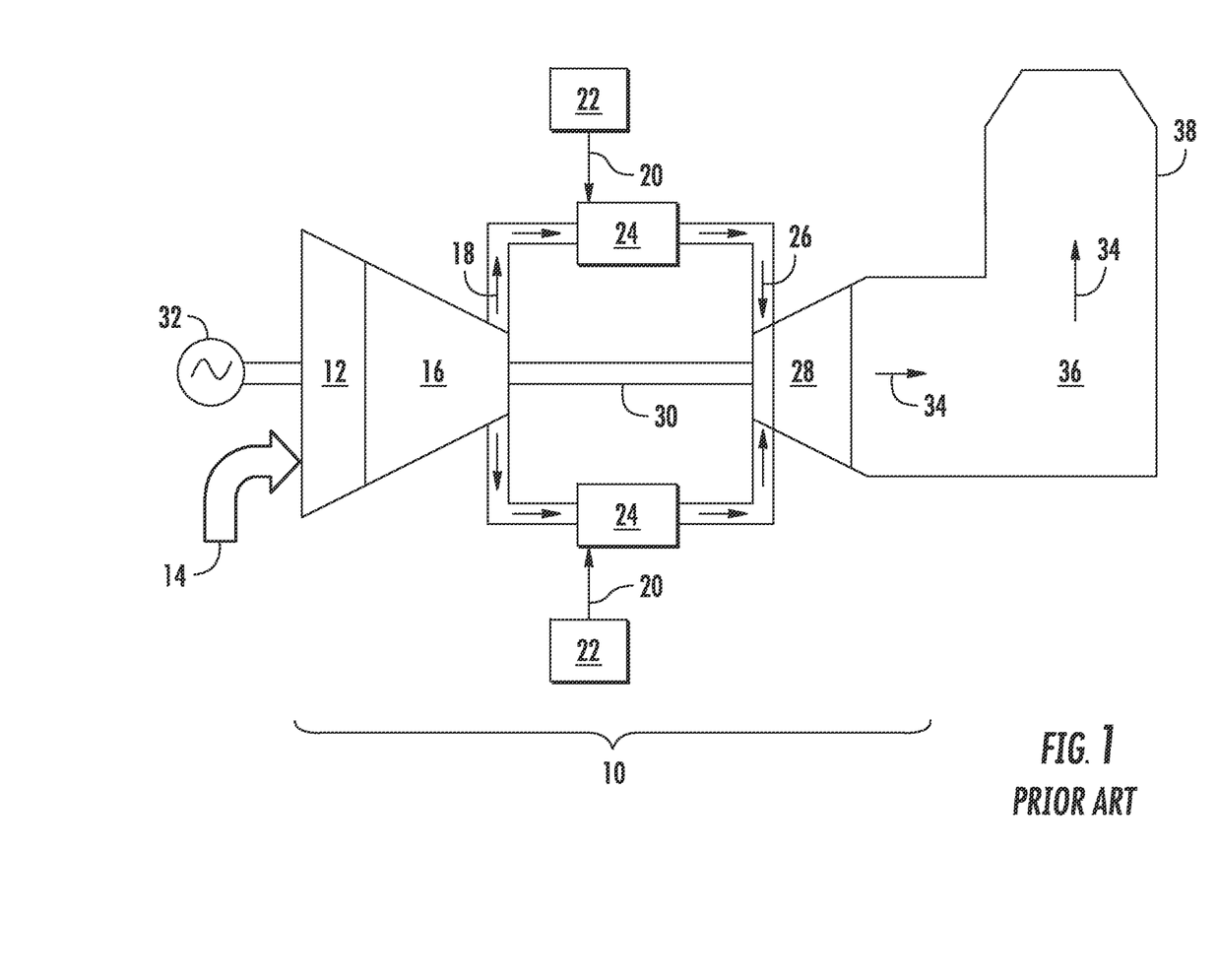
FIG. 1 is a functional block diagram of an exemplary gas turbine within the scope of the present invention.

Referring now to the drawings, wherein identical numerals indicate the same elements throughout the figures, FIG. 1 provides a functional block diagram of an exemplary gas turbine 10 that may incorporate various embodiments of the present invention. As shown, the gas turbine 10 generally includes an inlet section 12 that may include a series of filters, cooling coils, moisture separators, and/or other devices to purify and otherwise condition a working fluid (e.g., air) 14 entering the gas turbine 10. The working fluid 14 flows to a compressor section where a compressor 16 progressively imparts kinetic energy to the working fluid 14 to produce a compressed working fluid 18 at a highly energized state.

The compressed working fluid 18 is mixed with a fuel 20 from a fuel supply 22 to form a combustible mixture within one or more combustors 24. The combustible mixture is burned to produce combustion gases 26 having a high temperature and pressure. The combustion gases 26 flow through a turbine 28 of a turbine section to produce work. For example, the turbine 28 may be connected to a shaft 30 so that rotation of the turbine 28 drives the compressor 16 to produce the compressed working fluid 18. Alternately or in addition, the shaft 30 may connect the turbine 28 to a generator 32 for producing electricity. Exhaust gases 34 from the turbine 28 flow through an exhaust section 36 that connects the turbine 28 to an exhaust stack 38 downstream from the turbine 28. The exhaust section 36 may include, for example, a heat recovery steam generator (not shown) for cleaning and extracting additional heat from the exhaust gases 34 prior to release to the environment.

Figure 2:
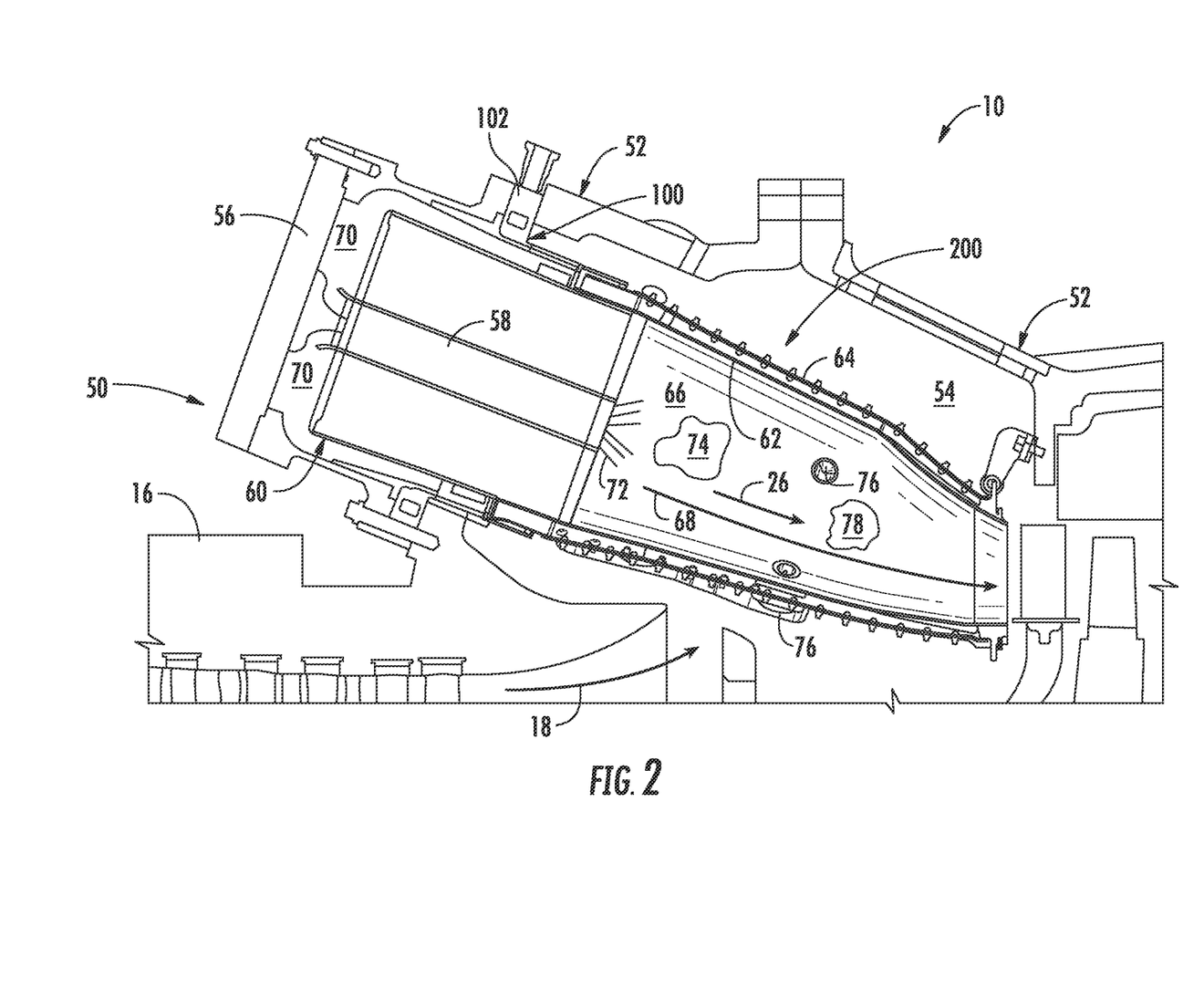
FIG. 2 is a cross sectional side view of a portion of an exemplary gas turbine, including an exemplary combustor that may encompass various embodiments of the present invention.

FIG. 2 provides a cross sectional side view of a portion of an exemplary gas turbine 10 including an exemplary combustor 50 that may encompass various embodiments of the present disclosure. As shown, the combustor 50 is at least partially surrounded by an outer casing 52 such as a compressor discharge casing and/or an outer turbine casing. The outer casing 52 is in fluid communication with the compressor 16 and at least partially defines a high pressure plenum 54 that surrounds at least a portion of the combustor 50. An end cover 56 is coupled to the outer casing 52 at one end of the combustor 50.

As shown in FIG. 2, the combustor 50 generally includes at least one axially extending fuel nozzle 58 that extends downstream from the end cover 56, an annular cap assembly 60 that extends radially and axially within the outer casing 52 downstream from the end cover 56, an annular hot gas path duct or combustion liner 62 that extends downstream from the cap assembly 60 and an annular flow sleeve 64 that surrounds at least a portion of the combustion liner 62. The combustion liner 62 defines a combustion chamber 66 within the combustor 50 and a hot gas path 68 for routing the combustion gases 26 through the combustor 50. The end cover 56 and the cap assembly 60 at least partially define a head end 70 of the combustor 50. The fuel nozzle(s) 58 extend at least partially through the cap assembly 60 to provide a first combustible mixture 72 that consists primarily of the fuel 20 (FIG. 1) and a portion of the compressed working fluid 18 from the compressor 16 to a primary combustion zone 74 that is defined within the combustion chamber 66 downstream from the fuel nozzle(s) 58.

In particular embodiments, the combustor 50 includes one or more radially extending fuel injectors 76 also known as late-lean fuel injectors that extend through the flow sleeve 64 and the combustion liner 62 at a point that is downstream from the primary combustion zone 74. The combustion liner 62 may further define a secondary combustion zone 78 that is proximate to the fuel injector(s) 76 and downstream from the primary combustion zone 74.

As shown in FIG. 2, the combustor 50 may include an annular fuel distribution manifold 100 for providing fuel to the combustor 50. In particular embodiments, the fuel distribution manifold 100 provides fuel to the fuel injector(s) 76. However, the fuel distribution manifold 100 may be modified to provide fuel to any part of the combustor 50 such as to the axially extending fuel nozzle(s) 56. As shown, the fuel distribution manifold 100 may at least partially surround the cap assembly 60.

Figure 3:
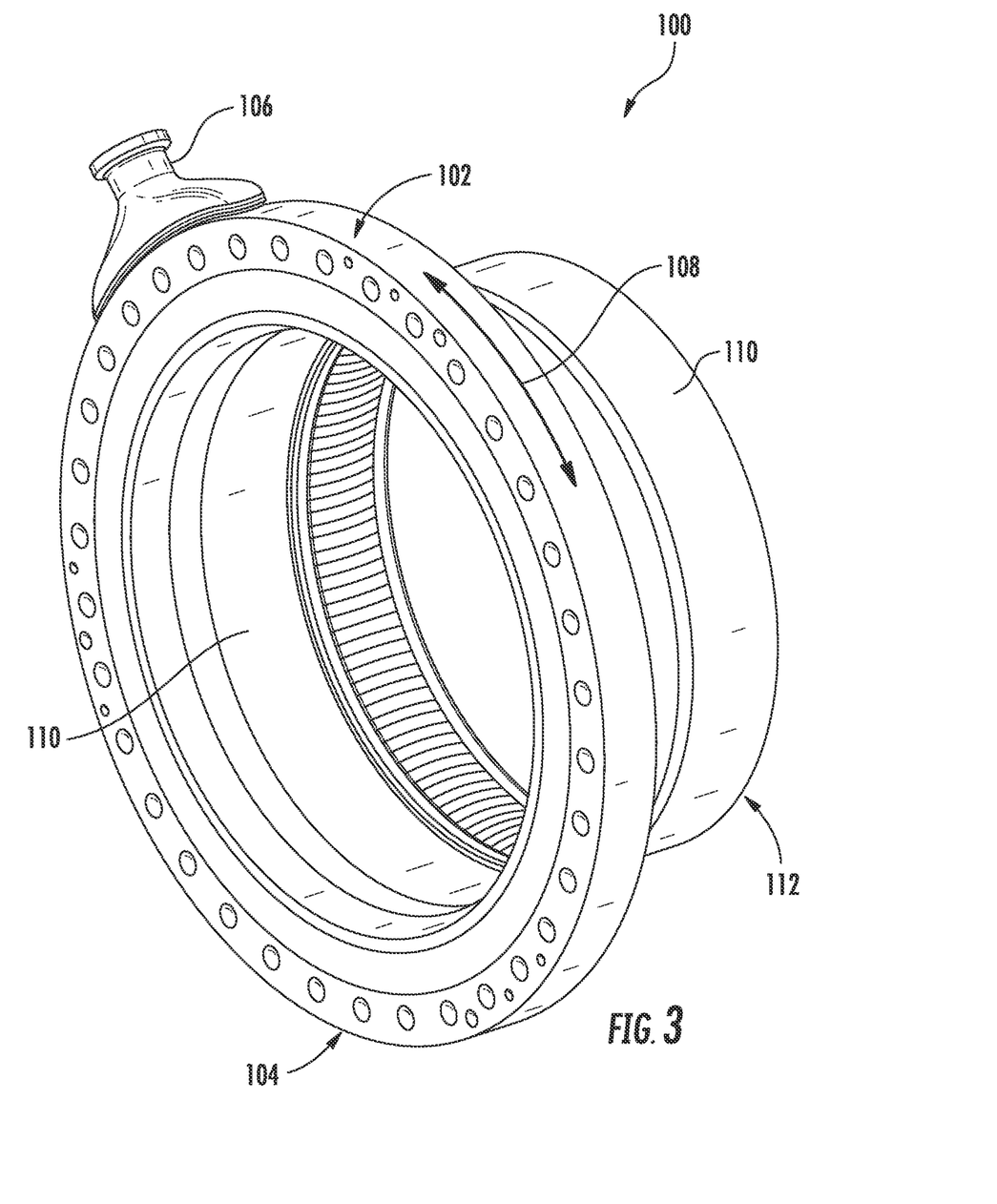
FIG. 3 is a perspective view of a fuel distribution manifold according to at least one embodiment of the present invention.
Figure 4:
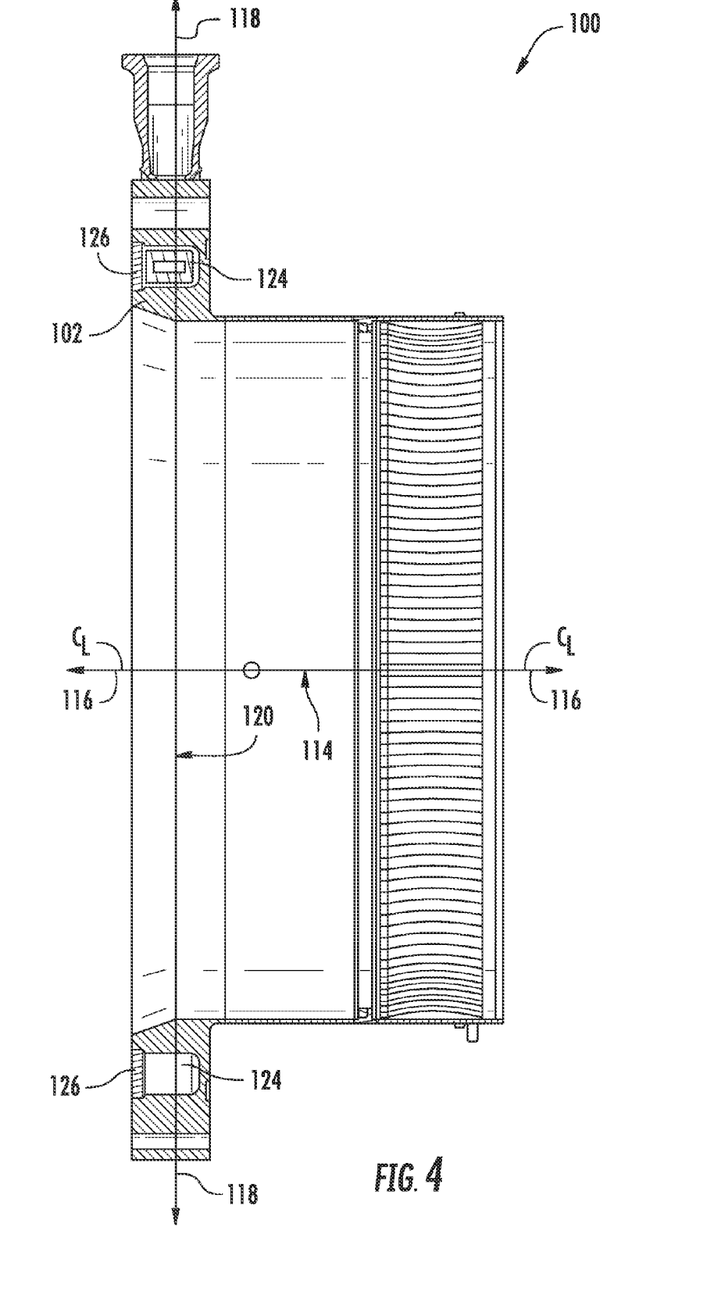
FIG. 4 is a cross sectional side view of the fuel distribution manifold as shown in FIG. 3, according to at least one embodiment of the present invention.
Figure 5:
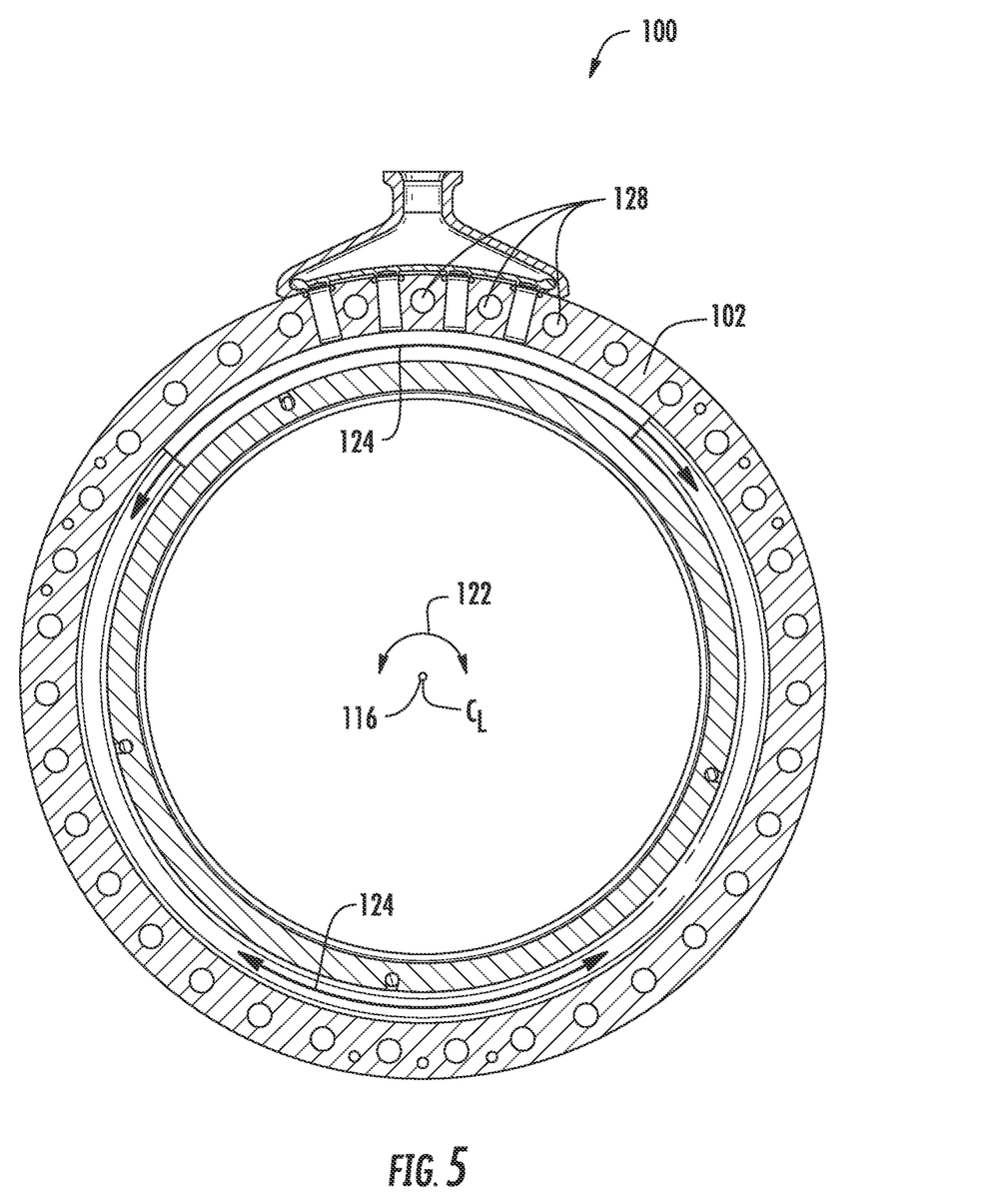
FIG. 5 is a cross sectional downstream view of the fuel distribution manifold as shown in FIG. 4, according to at least one embodiment of the present invention.

FIG. 3 provides a perspective view of the fuel distribution manifold 100 according to at least one embodiment of the present invention, FIG. 4 provides a cross section side view of the fuel distribution manifold 100 as shown in FIG. 3, and FIG. 5 provides a cross section downstream view of the fuel distribution manifold 100 as shown in FIG. 3. In particular embodiments, as shown in FIG. 3, an annular flange 102 is disposed at an upstream end 104 of the fuel distribution manifold and a fuel distribution cap 106 extends outward from an outer surface 108 of the flange 102. The outer surface 108 extends circumferentially around the flange 102. One or more annular support sleeve(s) 110 may extend generally downstream from the flange 102 towards a downstream end 112 of the fuel distribution manifold 100.

In particular embodiments, as shown in FIG. 3, the fuel distribution cap 106 extends partially across the outer surface 108 of the flange 102. For example, the fuel distribution cap 106 generally extends axially and circumferentially across at least a portion of the outer surface 108 of the flange 102 and radially outward from the outer surface 108 of the flange 102. The fuel distribution cap 106 may be connected to the flange by welding, brazing or by any other mechanical means known in the art suitable for the operating environment of the fuel distribution manifold 100.

As shown in FIG. 4, the fuel distribution manifold 100 defines an axial direction 114 that corresponds to an axial centerline 116 of the flange 102 and a radial direction 118 that is defined along a line 120 that extends perpendicular to the axial centerline 116. As shown in FIG. 5, a circumferential direction 122 is defined with the respect to the axial centerline 116 of the fuel distribution manifold 100.

In particular embodiments, as show in FIGS. 4 and 5, a primary fuel plenum 124 extends circumferentially within the flange 102. The primary fuel plenum 124 may extend partially or entirely around the flange 102. The primary fuel plenum 124 may be cast into the flange 102 and/or may be machined into the flange 102. As shown in FIG. 4, the primary fuel plenum 124 may be sealed using an outer band 126 that extends circumferentially around the flange 102. The outer band 126 may be joined to the flange 102 in any manner known in the art that is suitable to seal the primary fuel plenum. For example, the outer band 126 may be brazed or welded to the flange 102.

In particular embodiments, as shown in FIG. 5, a plurality of bolt holes 128 extend axially through the flange 102. The bolt holes 128 are generally evenly spaced circumferentially around the flange 102 to provide for an even pre-load around the circumference of the flange 102 when installed into the combustor 50 (FIG. 2).

Figure 6:
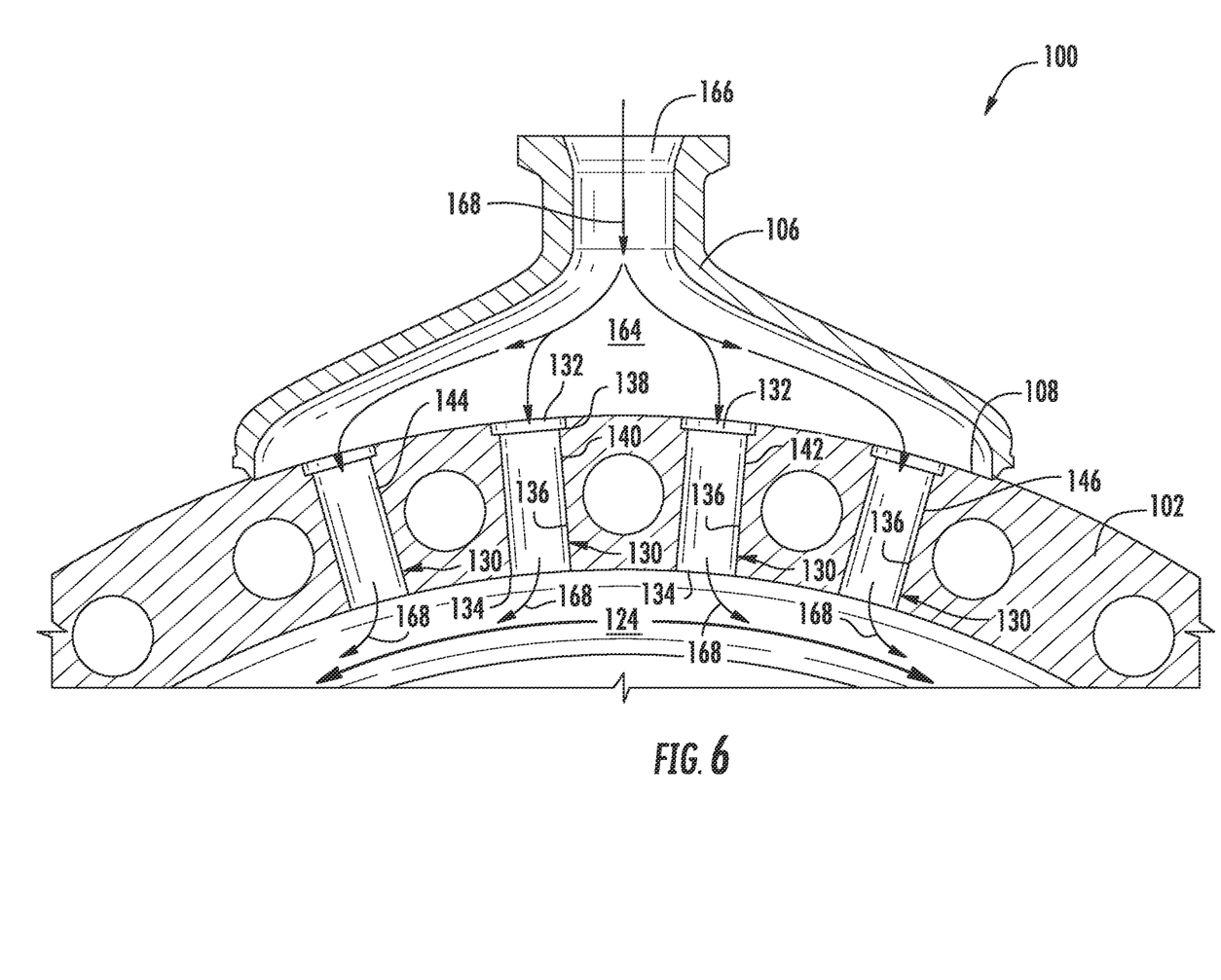
FIG. 6 is a an enlarged partial view of the fuel distribution manifold as shown in FIG. 5, according to at least one embodiment.

FIG. 6 provides an enlarged view of a portion of the fuel distribution manifold 100 as shown in FIG. 5, according to one embodiment of the present invention. As shown in FIG. 6, a plurality of radially extending orifices 130 extend through the outer surface 108 of the flange 102 to provide for fluid communication into the primary fuel plenum 124. By having a plurality of the orifices 130, additional fuel inlet area may provided when compared to a single orifice without offsetting the spacing between the bolt holes 128. As a result fuel velocity may be lowered as the fuel enters the primary fuel plenum 124. Each orifice 130 includes an inlet 132 generally adjacent to the outer surface 108 of the flange, an outlet 134 that is generally adjacent and in fluid communication with the primary fuel plenum 124 and an inner surface 136 that extends between the inlet 132 and the outlet 134. In addition, each orifice 130 may include a step feature 138 that is disposed generally adjacent to the inlet 132.

In one embodiment, the plurality of orifices 130 include a first orifice 140 and a second orifice 142 that extend radially through the outer surface 108 of the flange 102 to provide for fluid communication into the primary fuel plenum 124. In other embodiments, the plurality of orifices 130 may include a third orifice 144 a fourth orifice 146, or any number of the orifices 130 that extend radially through the outer surface 108 of the flange 102 to provide fluid communication into the primary fuel plenum 124.

As shown in FIG. 6, the orifices 130 extend between two adjacent bolt holes 128 without interrupting a common circumferential spacing between each of the plurality of bolt holes 128. This allows for an even pre-load at each bolt hole 128 location around the flange 102, thereby providing for an even seal between the outer casing 52 (FIG. 2) and the flange 102. In addition, by having a plurality of the orifices 130 rather than one large orifice, the wall thickness between each orifice 130 and a corresponding bolt hole 128 is optimized, thereby enhancing the durability of the flange 102 and allowing for a thinner flange 102 which decreases weight and cost. In one embodiment, the first orifice 140 is circumferentially separated from the second orifice 142 by at least one of the plurality of bolt holes 128.

Figure 7:
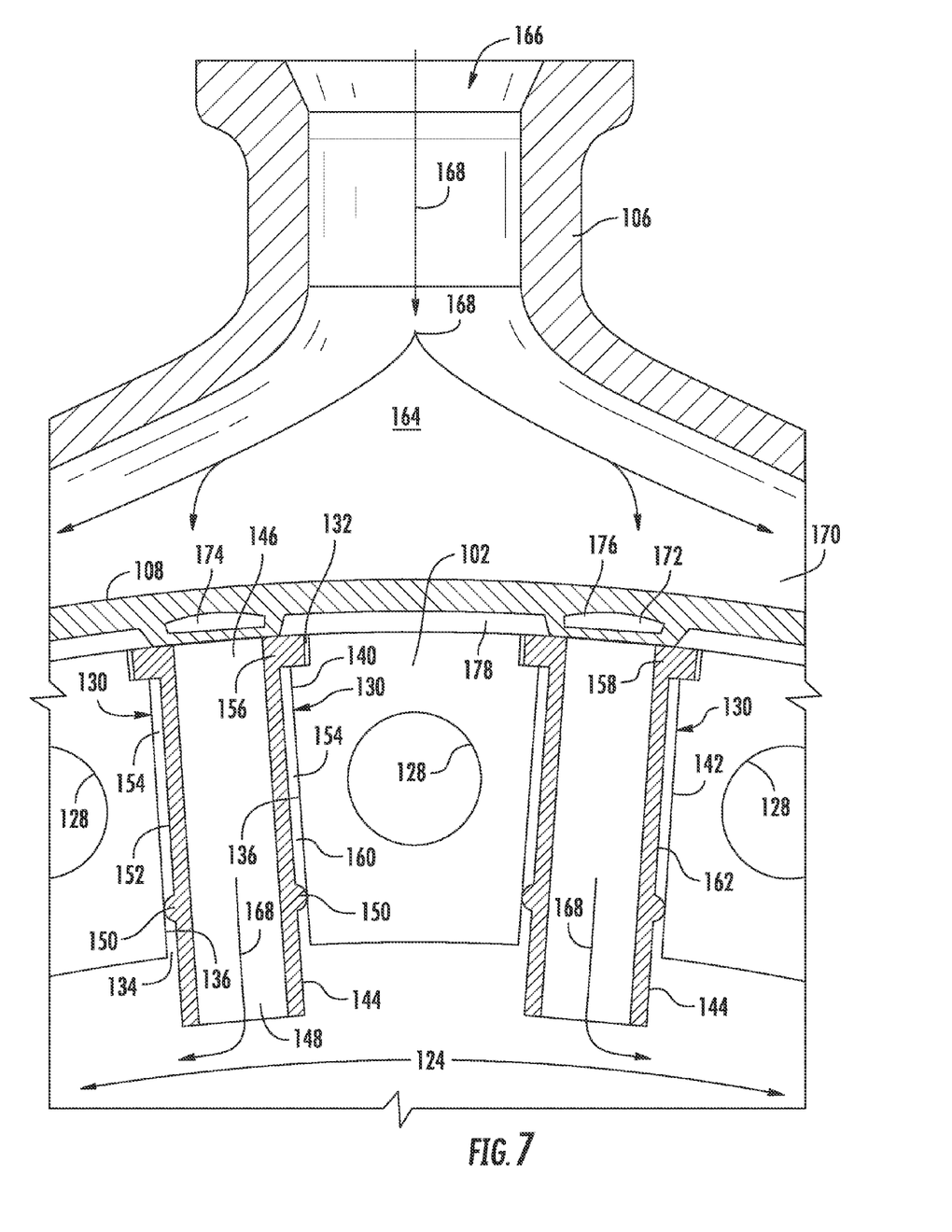
FIG. 7 is a cross sectioned enlarged view of a portion of the fuel distribution manifold including a pair of orifice inserts according to at least one embodiment of the present invention.

FIG. 7 provides an enlarged view of a portion of the fuel distribution manifold 100 as shown in FIG. 6, according to one embodiment of the present invention. In particular embodiments, as shown in FIG. 7, the fuel distribution manifold 100 includes a plurality of orifice inserts 144. Each orifice insert 144 is received in a corresponding orifice 130 so as to extend generally radially through the orifice 130. Each orifice insert 144 may be coaxially or concentrically aligned within each corresponding orifice 130. Each or some of the orifice inserts 144 may be sized and/or shaped the same or differently so as to achieve a desired flow rate of fuel flowing through the orifice inserts 144 into the primary fuel plenum 124.

As shown in FIG. 7, the orifice inserts 144 have a generally cylindrical shape. However, it should be obvious to one of ordinary skill in the art that the orifice inserts 144 may have any cross section shape which allows fuel to flow through the orifice 130 into the primary fuel plenum 124. For example, the orifice inserts 144 may have a circular, oval, rectangular, square cross sectional shape or any combination thereof. The orifice inserts 144 include an inlet 146 that is disposed at the inlet 132 of a corresponding orifice 130 and an outlet 148 that is disposed generally adjacent to the outlet 134 of the corresponding orifice 130 and that is in fluid communication with the primary fuel plenum 124.

In one embodiment, as shown in FIG. 7, each orifice insert 144 includes a rib 150 or other separation feature that extends outward from an outer surface 152 of the orifice inserts 144. The rib 150 positions the orifice inserts 144 concentrically and/or coaxially into the orifice 130. The rib 150 also provides for an insulation gap 154 between the outer surface 152 of the orifice insert 144 and the inner surface 136 of the orifice 130, thereby reducing conductive cooling of the flange 102 caused by the fuel flowing through the orifice inserts 144 into the primary fuel plenum 124. As a result, thermal stress associated with the thermal gradients between the orifice insert 144 and the flange 102 may be reduced which enhances the overall durability of the fuel distribution manifold 100.

In one embodiment the plurality of orifice inserts 144 includes at least a first orifice insert 156 that is disposed within the first orifice 140 and a second orifice insert 158 that is disposed within the second orifice 142. A first insulation gap 160 is defined between the first orifice insert 156 and the first orifice 140 and a second insulation gap 162 is defined between the second orifice insert 158 and the second orifice 142.

In particular embodiments, as shown in FIGS. 6 and 7, a fuel distribution plenum 164 is at least partially defined within the fuel distribution cap 106. The fuel distribution plenum 164 is in fluid communication with the inlet 132 of each orifice 130 (FIG. 6) and/or the inlet 146 of each of the orifice insert 144 (FIG. 7). In one embodiment, as shown in FIG. 7, the fuel distribution cap 106 includes an inlet port 166 that is in fluid communication with the fuel distribution plenum 164. The fuel inlet port 166 may be coupled to an external fuel supply 22 (FIG. 1) so as to provide a flow of fuel 168 into the fuel distribution plenum 164.

The fuel distribution cap 106 is configured to evenly distribute fuel 168 between the fuel distribution plenum 164 and each inlet 132 of each orifice 130 (FIG. 6) and/or the inlet 146 of each orifice insert 144 (FIG. 7). For example, in one embodiment as shown in FIG. 6, the fuel distribution cap 106 is flared outward between the inlet port 166 and the outer surface 108 of the flange 102, thereby at least partially stabilizing pressure head of the fuel before it is fed into each inlet 132 of each orifice 130 (FIG. 6) and/or the inlet 146 of each orifice insert 144 (FIG. 7). As a result, the flow velocity of the fuel 168 may be regulated so as to evenly distribute the fuel 168 between each orifice 130 as the fuel flows into the primary fuel plenum 124, thereby enhancing the overall performance of the fuel distribution manifold 100.

Figure 8:
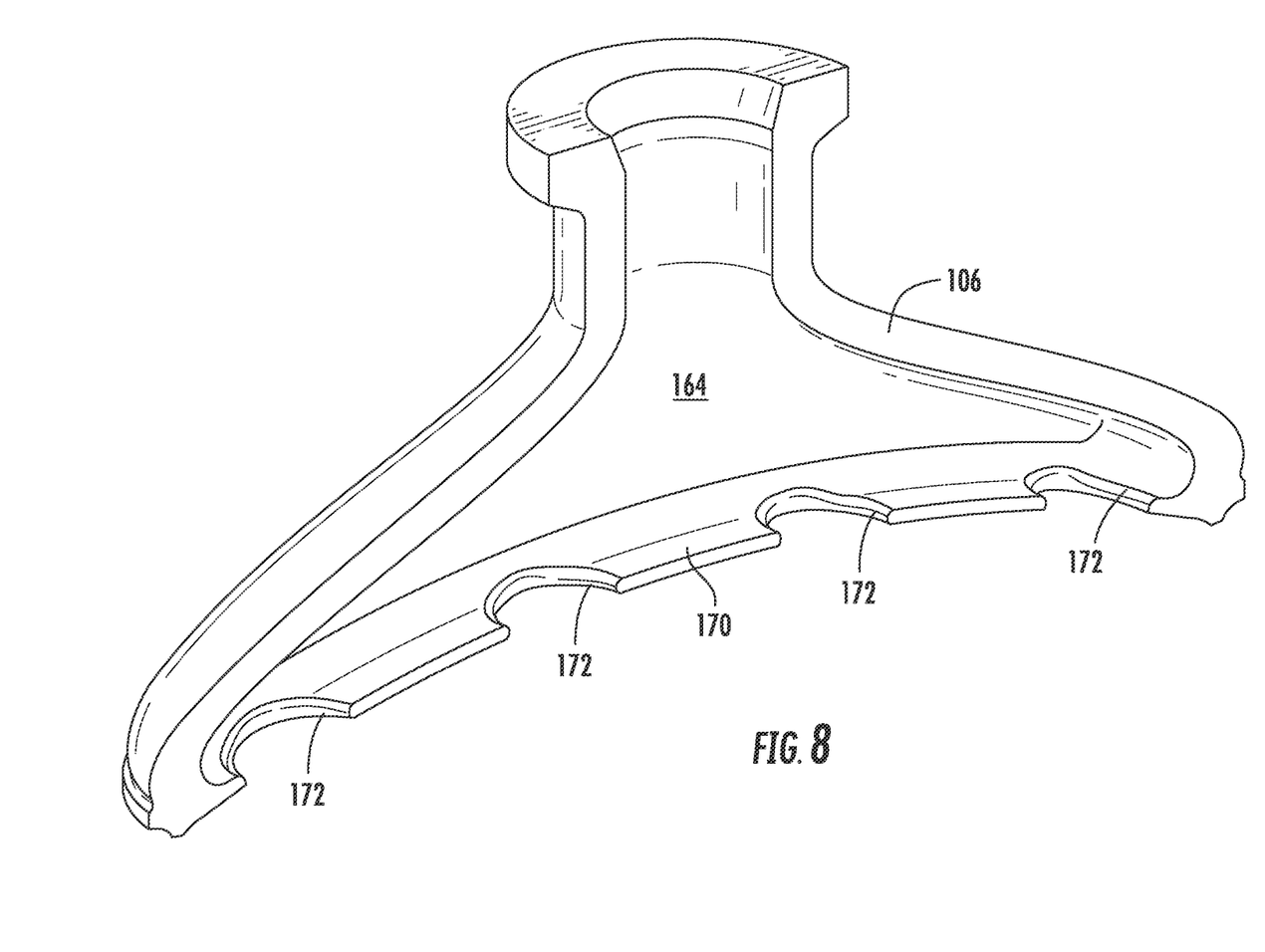
FIG. 8 is an enlarged cross section perspective view of a fuel distribution cap of the fuel distribution manifold according to at least one embodiment of the present invention.
Figure 9:
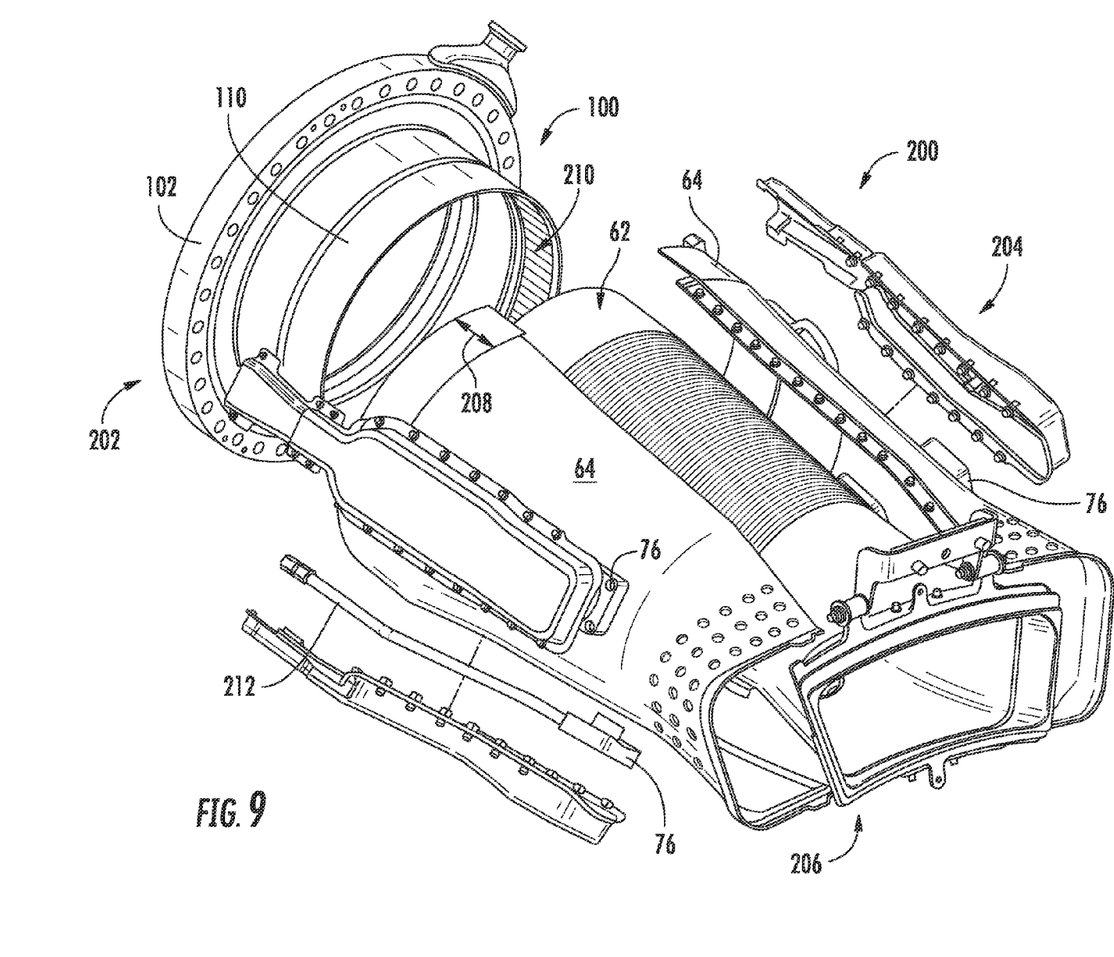
FIG. 9 is a perspective view of an assembled combustion module including a fuel distribution manifold as shown in FIG. 2, according to at least one embodiment of the present invention.

FIG. 8 provides a cross section perspective view of the fuel distribution cap 106 according to one embodiment of the present invention as shown in part in FIG. 7. As shown in FIG. 8, the fuel distribution cap 106 comprises a floor or bottom portion 170 that partially defines the fuel distribution plenum 164. A plurality of outlets 172 extend through the floor portion 170. As shown in FIG. 7, each outlet 172 is substantially coaxially and/or concentrically aligned with a corresponding inlet 132 (FIG. 6) of a corresponding orifice 130 (FIG. 6) and/or with the inlet 146 of a corresponding orifice insert 146 (FIG. 9). In one embodiment, as shown in FIG. 7, the plurality of outlets 172 includes a first outlet 174 that is coaxially aligned with the first orifice 140 and/or the first orifice insert 156 and a second outlet 176 that is coaxially aligned with the second orifice 142 and/or the second orifice insert 158.

In at least one embodiment, as shown in FIG. 7, a generally radial gap 178 is defined between the floor portion 170 of the fuel distribution cap 106 and the outer surface 108 of the flange 102. In operation, the flange 102 is generally much hotter than the fuel 168 flowing into and through the fuel distribution plenum 164. The gap 178 provides an insulation boundary between the fuel 168 flowing through the fuel distribution plenum 144 and the outer surface 108 of the flange 102, thereby reducing thermal stresses around the fuel distribution cap 106 and along the flange 102 outer surface 108. As a result, the overall durability of the fuel distribution manifold 100 may be enhanced.

Figure 10:
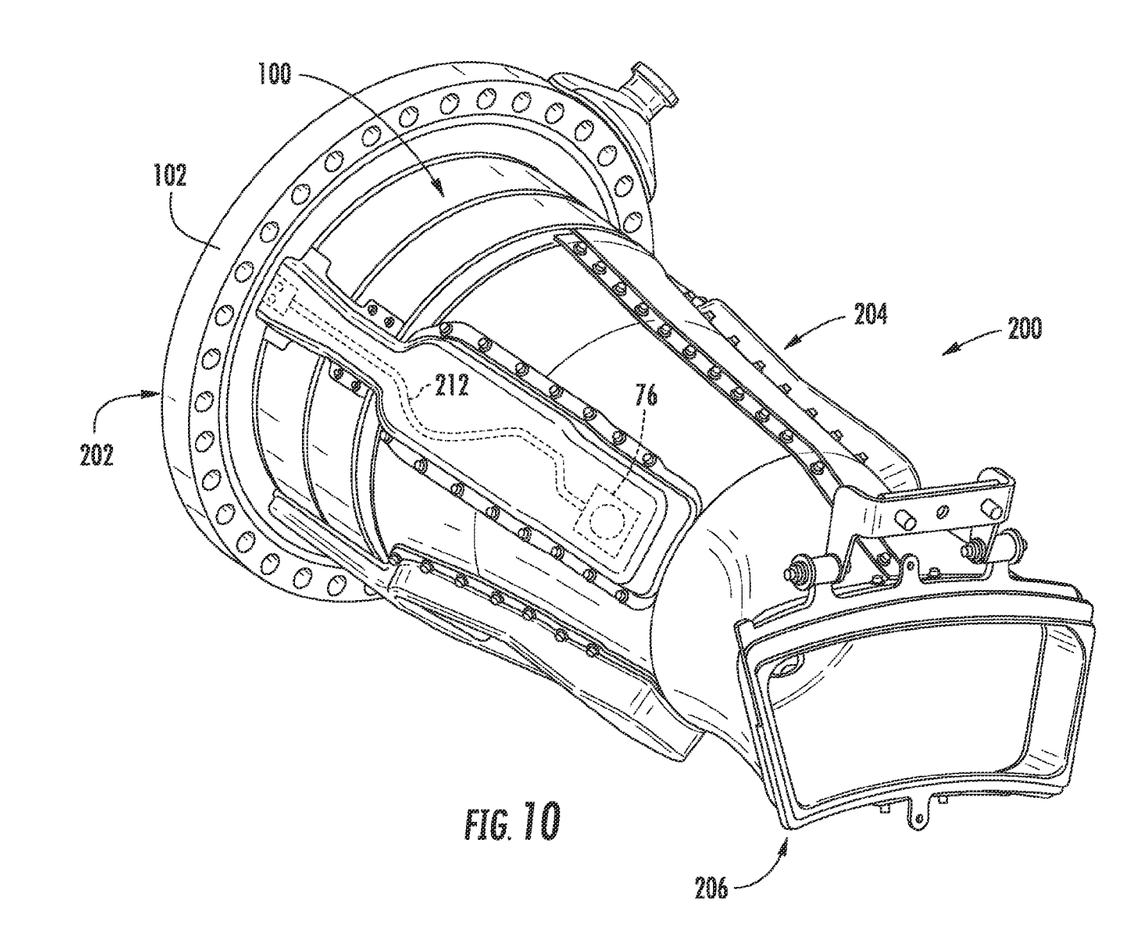
FIG. 10 is an exploded view of the combustion module as shown in FIG. 9, according to at least one embodiment of the present invention.

FIG. 9 provides a perspective view of an assembled combustion module 200 that may incorporate various embodiments of the present invention, and FIG. 10 provides an exploded view of the combustion module 200 as shown in FIG. 9. As shown in FIG. 9, the combustion module 200 generally includes the fuel distribution module 100 disposed at a forward or upstream end 202 and a fuel injection assembly 204 that extends generally downstream from the fuel distribution manifold 100 and that terminates at an aft or downstream end 206 of the combustion module 200.

As shown in FIG. 10, the fuel injection assembly 204 may include some or all of the combustion liner 62, the flow sleeve 64 and the fuel injector(s) 76. When assembled, as shown in FIG. 9, a forward portion 208 (FIG. 10) of the flow sleeve 64 is concentrically aligned within one of the support sleeves 110 of the fuel distribution manifold 100. A compression or spring seal 210 extends generally radially between the forward portion 208 of the flow sleeve and the support sleeve 110 to provide structural support and/or to allow for axial movement between the fuel injection assembly 204 and the fuel distribution manifold 100 during operation of the combustor 50 (FIG. 2).

As shown in FIG. 9, each fuel injector 76 may be fluidly coupled to the fuel distribution manifold 100 through a fluid conduit 212 that extends between the fuel injector 76 and the flange 102 of the fuel distribution manifold 100. As shown in FIG. 2, the flange 102 of the fuel distribution manifold 100 may be coupled or connected to the outer casing 52 thereby providing mounting support for the combustion module 200 within the combustor 50. The fluid conduit generally provides for fluid communication between the primary fuel plenum 124 (FIG. 5) and the fuel injector(s) 76 during late-lean operation of the combustor 50. (FIG. 2).

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel distribution manifold for delivering fuel to a combustor, comprising:
   a. an annular flange having an outer surface that extends circumferentially around the flange;
   b. a primary fuel plenum that extends circumferentially within the flange;
   c. a first orifice and a second orifice that extend radially through the outer surface of the flange to provide for fluid communication into the primary fuel plenum, the first orifice having an inlet adjacent to the outer surface and the second orifice having an inlet adjacent to the outer surface;
   d. a fuel distribution cap that extends partially across the outer surface of the flange, the fuel distribution cap having an inlet port; and
   e. a fuel distribution plenum at least partially defined within the fuel distribution cap and in fluid communication with the inlet port, the fuel distribution plenum being in fluid communication with the first orifice inlet and the second orifice inlet.

2. The fuel distribution manifold as in claim 1, further comprising a plurality of bolt holes that extend axially through the flange, the plurality of bolt holes being evenly spaced circumferentially around the flange, wherein the first orifice is circumferentially separated from the second orifice by at least one of the plurality of bolt holes.

3. The fuel distribution manifold as in claim 1, wherein the fuel distribution cap comprises a floor portion that partially defines the fuel distribution plenum, the fuel distribution cap having a first outlet coaxially aligned with the first orifice inlet and a second outlet coaxially aligned with the second orifice inlet.

4. The fuel distribution manifold as in claim 3, further comprising a gap defined between the floor portion of the fuel distribution cap and the outer surface of the flange.

5. The fuel distribution manifold as in claim 1, wherein the fuel distribution cap evenly distributes fuel between the fuel distribution plenum and the first outlet and the second outlet.

6. The fuel distribution manifold as in claim 1, further comprising a first orifice insert disposed within the first orifice and a second orifice insert disposed within the second orifice, wherein each of the first orifice insert and the second orifice insert include an outer surface.

7. The fuel distribution manifold as in claim 6, wherein each of the first orifice and the second orifice include an inner surface, a first insulation gap being defined between the outer surface of the first orifice insert and the inner surface of the first orifice and a second insulation gap defined between the outer surface of the second orifice insert and the inner surface of the second orifice.

8. A combustion module for a combustor of a gas turbine, comprising:
   a. a fuel injection assembly that terminates at an aft end of the combustion module, the fuel injection assembly having an annular combustion liner that defines a combustion chamber within the combustion module and a fuel injector that provides for fluid communication through the combustion liner and into the combustion chamber; and
   b. a fuel distribution manifold for delivering fuel to the fuel injection assembly, comprising:
      i. an annular flange having an outer surface that extends circumferentially around the flange, the flange at least partially defining a primary fuel plenum that extends circumferentially within the flange;
      ii. a first orifice and a second orifice that extend radially through the outer surface of the flange to provide for fluid communication into the primary fuel plenum, the first orifice having an inlet adjacent to the outer surface and the second orifice having an inlet adjacent to the outer surface;
      iii. a fuel distribution cap that extends partially across the outer surface of the flange, the fuel distribution cap having an inlet port; and
      iv. a fuel distribution plenum at least partially defined within the fuel distribution cap and in fluid communication with the inlet port, the fuel distribution plenum being in fluid communication with the first orifice inlet and the second orifice inlet.

9. The combustion module as in claim 8, further comprising a fluid conduit that fluidly connects the fuel distribution manifold to the fuel injector.

10. The combustion module as in claim 8, further comprising a plurality of bolt holes that extend axially through the flange, the plurality of bolt holes being evenly spaced circumferentially around the flange, wherein the first orifice is circumferentially separated from the second orifice by at least one of the plurality of bolt holes.

11. The combustion module as in claim 8, wherein the fuel distribution cap comprises a floor portion that partially defines the fuel distribution plenum, the fuel distribution cap having a first outlet coaxially aligned with the first orifice inlet and a second outlet coaxially aligned with the second orifice inlet.

12. The combustion module as in claim 11, wherein the fuel distribution manifold further comprises a gap defined between the floor portion of the fuel distribution cap and the outer surface of the flange.

13. The combustion module as in claim 8, wherein the fuel distribution manifold further comprises a first orifice insert disposed within the first orifice and a second orifice insert disposed within the second orifice, wherein each of the first orifice insert and the second orifice insert include an outer surface.

14. The combustion module as in claim 13, wherein each of the first orifice and the second orifice include an inner surface, the fuel distribution manifold further comprising a first insulation gap being defined between the outer surface of the first orifice insert and the inner surface of the first orifice and a second insulation gap defined between the outer surface of the second orifice insert and the inner surface of the second orifice.

15. A gas turbine, comprising:
   a. a compressor, a combustor disposed downstream from the compressor and a turbine disposed downstream from the combustor, the combustor being surrounded by an outer casing and having a fuel distribution manifold for delivering fuel to the combustor, the fuel distribution manifold comprising:
      i. an annular flange having an outer surface that extends circumferentially around the flange, the flange being connected to the outer casing;
      ii. a primary fuel plenum that extends circumferentially within the flange;
      iii. a first orifice and a second orifice that extend radially through the outer surface of the flange to provide for fluid communication into the primary fuel plenum, the first orifice having an inlet adjacent to the outer surface and the second orifice having an inlet adjacent to the outer surface;

iv. a fuel distribution cap that extends partially across the outer surface of the flange, the fuel distribution cap having an inlet port; and v. a fuel distribution plenum at least partially defined within the fuel distribution cap and in fluid communication with the inlet port, the fuel distribution plenum being in fluid communication with the first orifice inlet and the second orifice inlet.

16. The gas turbine as in claim 15, wherein the fuel distribution manifold further comprises a plurality of bolt holes that extend axially through the flange, the plurality of bolt holes being evenly spaced circumferentially around the flange, wherein the first orifice is circumferentially separated from the second orifice by at least one of the plurality of bolt holes.

17. The gas turbine as in claim 15, wherein the fuel distribution cap comprises a floor portion that partially defines the fuel distribution plenum, the fuel distribution cap having a first outlet coaxially aligned with the first orifice inlet and a second outlet coaxially aligned with the second orifice inlet.

18. The gas turbine as in claim 17, wherein the fuel distribution manifold further comprises a gap defined between the floor portion of the fuel distribution cap and the outer surface of the flange.

19. The gas turbine as in claim 15, wherein the fuel distribution manifold further comprises a first orifice insert disposed within the first orifice and a second orifice insert disposed within the second orifice, each of the first orifice insert and the second orifice insert having an outer surface.

20. The gas turbine as in claim 19, wherein each of the first orifice and the second orifice include an inner surface, the fuel distribution manifold further comprising a first insulation gap defined between the outer surface of the first orifice insert and the inner surface of the first orifice and a second insulation gap defined between the outer surface of the second orifice insert and the inner surface of the second orifice.

* * * * *